US009950908B2

(12) United States Patent
Verheyen et al.

(10) Patent No.: US 9,950,908 B2
(45) Date of Patent: Apr. 24, 2018

(54) SYSTEM AND METHOD FOR DETERMINING A LOAD IN A MATERIAL HANDLING SYSTEM

(71) Applicant: Magnetek, Inc., Menomonee Falls, WI (US)

(72) Inventors: Kurtis L. Verheyen, Glendale, WI (US); Aaron S. Kureck, Oconomowoc, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 72 days.

(21) Appl. No.: 15/066,061

(22) Filed: Mar. 10, 2016

(65) Prior Publication Data

US 2017/0260028 A1    Sep. 14, 2017

(51) Int. Cl.
| | |
|---|---|
| *G05B 5/00* | (2006.01) |
| *H02H 7/08* | (2006.01) |
| *H02P 1/04* | (2006.01) |
| *H02P 3/00* | (2006.01) |
| *H02P 7/00* | (2016.01) |
| *B66C 13/16* | (2006.01) |
| *H02P 23/14* | (2006.01) |
| *G01L 5/00* | (2006.01) |
| *G01L 3/04* | (2006.01) |
| *B66C 17/00* | (2006.01) |
| *H02H 7/085* | (2006.01) |

(52) U.S. Cl.
CPC ............... *B66C 13/16* (2013.01); *G01L 3/04* (2013.01); *G01L 5/00* (2013.01); *H02P 23/14* (2013.01); *B66C 17/00* (2013.01); *H02H 7/085* (2013.01); *H02H 7/0851* (2013.01)

(58) Field of Classification Search
CPC .. H02H 7/085; H02H 7/0851; H02P 29/0033; B23P 19/06; B25B 23/12
USPC .......................................................... 318/476
See application file for complete search history.

(56) References Cited

U.S. PATENT DOCUMENTS

| | | | |
|---|---|---|---|
| 4,671,494 | A | 6/1987 | Makino et al. |
| 5,859,373 | A | 1/1999 | Münzebrock et al. |
| 6,527,130 | B2 * | 3/2003 | Ruddy .................... B66D 1/46 212/270 |
| 6,543,300 | B2 | 4/2003 | Kiviniitty |
| 6,655,662 | B2 | 12/2003 | Kemppainen |
| 6,720,751 | B2 | 4/2004 | Plasz et al. |
| 7,206,662 | B2 | 4/2007 | Sparenborg et al. |

(Continued)

*Primary Examiner* — Kawing Chan
*Assistant Examiner* — Bradley Brown
(74) *Attorney, Agent, or Firm* — Boyle Fredrickson, SC (57) ABSTRACT

A system and method for determining the load in a material handling system is disclosed. The load weight detection system measures torque at four operating conditions both at constant speed and during acceleration. The level of torque generated by the motor under each of these operating conditions is stored in the motor drive. The motor drive also receives a signal corresponding to the speed of the hoist motor. Based on the measured torque, as well as the expected torque at no load and at rated load for the measured speed, the motor drive then determines the load present on the hoist. In some systems, two or more hoists are required to operate in tandem to lift a load. Each motor drive determines the weight of the load supported by its respective hoist motor and determines a total weight of the load based on the weights determined by each motor drive.

18 Claims, 6 Drawing Sheets

(56) References Cited

U.S. PATENT DOCUMENTS

| | | |
|---|---|---|
| 7,234,684 B2 | 6/2007 | Kohlenberg et al. |
| 7,267,241 B2 | 9/2007 | Franzen et al. |
| 7,353,959 B2 | 4/2008 | Zakula, Sr. et al. |
| 7,497,492 B2 | 3/2009 | Gonzalez et al. |
| 7,896,315 B2 | 3/2011 | Faust |
| 2006/0102578 A1* | 5/2006 | Zakula, Sr. ............. B66C 13/22 212/283 |
| 2008/0272725 A1 | 11/2008 | Bojrup et al. |
| 2013/0302113 A1* | 11/2013 | Byzewski ............. G01G 19/18 414/21 |
| 2014/0216171 A1 | 8/2014 | Kettenbach et al. |

\* cited by examiner

SYSTEM AND METHOD FOR DETERMINING A LOAD IN A MATERIAL HANDLING SYSTEM

BACKGROUND OF THE INVENTION

The subject matter disclosed herein relates to measuring the load in a material handling system. More specifically, the subject matter disclosed herein relates to a method and apparatus for measuring the load in a material handling system using one or more motor drives to lift a load, where each motor drive controls operation of a hoist motor.

Material handling systems are widely used to lift heavy loads, weighing up to hundreds of tons. A typical material handling system includes at least one motor used to raise and lower the load and at least one additional motor to position the material handling system over the load to be moved. Common applications include manufacturing facilities, in which large components may be positioned for assembly and/or the final assembly may be moved for shipping. Further, material handling systems are often required to handle loads of varying sizes. It is known that electric motors are capable of producing rated torque up to rated speed. Therefore, it may be desirable to verify that the weight of the load the system is attempting to move is less than or equal to the rated capacity of the system, such that the operator may safely raise/lower and position the load.

It is known that this weight measurement may be performed by the addition of an external weighing device, such as a load cell. However, external weighing devices have not been realized without certain disadvantages. External weighing devices add expense in both material and commissioning costs. They load cell is typically mounted to a mechanical component of the material handling system that is subject to a degree of strain or deflection as a result of lifting the load. Consequently, the load cell may need to be mounted on the hook or another movable member of the material handling system. The feedback signal from the load cell must then be wired or wirelessly communicated to a controller. The feedback signal may also need calibration to the load.

As is understood in the art, weighing devices measure forces applied to the device. The force applied as a result of gravity acting on the load corresponds to the weight of the object; however, in a material handling system, other forces are similarly applied to the weighing device. For example, the torque required to accelerate a load when raising the load or to decelerate a load when lowering the load provides an additive force on the weighing device. Similarly, deceleration when raising or acceleration when lowering is assisted by gravity, resulting in a reduced weight being measured by the weighing device. In order to obtain an accurate measurement of the weight of the load, therefore, the motor either raises and suspends the load at zero speed or operates for a short period at a constant speed when measuring the load.

Other systems have been introduced to obtain a measurement of the load as a function of the current provided to the motor. However, these systems have similarly not been realized without certain disadvantages. Although the current provided to the motor is a function of the weight of the load, the current is also a function of the torque applied to the load. Therefore, the magnitude of the current also varies during acceleration or deceleration of the motor. Consequently, current measurement systems may also require the motor to either raise and suspend the load at zero speed or operate for a short period at a constant speed when measuring the load. As a result of the limitations on obtaining accurate measurements, systems that employ either a load cell or current measurement may perform an initial test of the weight of the load, but make no further checks as a load is raised or lowered.

However, in some applications, the weight of the load may vary as the load is raised or lowered. In some instances, the variation in weight may be unexpected. For example, in the shipping industry, containers are loaded and unloaded between storage facilities, trucks, trains, and ships. The containers are often stacked several layers high and in close proximity to each other or to walls, for example, within a hold of a ship. As the container is raised or lowered, it may sway, for example, due to the wind, or the other containers may move, for example, as the deck of a ship moves. In either instance, the container may contact or become snagged on an adjacent container, causing a change in the weight of the load. In other instances, the variation in weight is part of the application requirements. For example, bulk materials such as sand or salt may require a bucket, or clam shell, attachment. The clam-shell is lowered in an open position and closed to scoop up a load of the bulk material. As the operator begins to raise the clam-shell, there may be some initial slack in the cable. The weight of the load may be significantly lower or even near zero during the period at which the load is measured. The load may, therefore, be initially determined as safe but may subsequently exceed the rated capacity of the material handling system.

Thus, it is desirable to provide a system configured to periodically monitor the weight of the load throughout a run without requiring external load measurement devices.

In still other applications, a load may require multiple hoists for lifting due, for example, to the weight and/or size of the load. In one application, a single bridge may include two or more hoists mounted to a single bridge. In another application, multiple bridges may be included on a single set of rails and each bridge includes a single hoist. In either application, multiple hoists may be utilized to lift the single load.

When multiple hoists are used for lifting a load, the overall system load ratings must be considered. Although each hoist has a rated capacity, the bridge and rails also have load ratings which cannot be exceeded. When lifting a load with multiple hoists, each hoist may be operating within its rated capacity however the combined weight of the load on a single bridge or on a set of rails may exceed the load rating for the bridge or rails.

Thus, it is desirable to provide a system to determine a total weight of a load when multiple hoists are used to lift the load and to compare the total weight to the ratings of the bridge and/or rails on which the hoists are located.

BRIEF DESCRIPTION OF THE INVENTION

The subject matter disclosed herein describes a system and method for determining the load present in a material handling system. An improved system for determining the weight of a load applied to lifting apparatus of a hoist separates the weight of the load from the mechanics of the material handling system. The material handling system may include, for example, cabling, hook blocks, and the like which provide some load to the motor event when the hoist is in an unloaded state. Further, the cable weight varies as the hook block and a load, if attached, are raised and lowered. The drive train of the material handling system may also include a gearbox or other mechanical coupling through which the torque generated by the motor is transferred to the sheave. The mechanical inefficiencies of the drive train as well as the weight of the cabling and hook block require some level of torque to run a hoist even in an unloaded condition.

The load weight detection system disclosed herein utilizes four measured operating conditions by which the weight of the load is determined. The hoist motor is run at a low speed and at rated speed with both no load and with rated load connected to the hoist. The level of torque generated by the motor under each of these four operating conditions is stored in parameters in the motor drive. Further, these four operating conditions are measured both for constant speed operation and during acceleration. When the motor is accelerating, the torque may be observed over a small window surrounding the desired speed or over a small window close to the actual speed. As a result, two sets of parameters are stored in the motor drive.

When the motor drive is controlling operation of the hoist motor, the motor drive utilizes the two sets of parameters to determine the weight of a load connected to the hoist. When the motor drive is accelerating the speed of the motor, the motor drive utilizes the set of parameters which include the torque observed during acceleration of the motor under known conditions, and when the motor drive is operating at a constant or nearly constant speed, the motor drive utilizes the set of parameters which include the torque observed during constant speed operation of the motor. The motor drive receives a signal corresponding to the speed of the hoist motor. Using the appropriate set of parameters, the motor drive determines an expected torque at no load and at rated load for the measured speed. The motor drive also measures the torque output by the motor at the measured speed. Based on the measured torque, as well as the expected torque at no load and at rated load for the measured speed, the motor drive then determines the load present on the hoist.

The material handling system may also include multiple hoists, where two or more hoists are required to operate in tandem to lift a load. Each motor drive determines the portion of the load supported by the respective hoist motor it is controlling by using, for example, the method of weight measurement discussed above. A first motor drive transmits the weight of the load as seen by that hoist motor to a second motor drive operating in tandem to lift the load. The second motor drive adds the weight of the load as seen by the second hoist motor to the weight received from the first motor drive. For each additional drive operating in tandem to lift the load, the second and then subsequent motor drives transmit the combined load to the next motor drive in the chain. At each motor drive, the sum of the load as determined at that motor drive is compared to a rated load capacity for the material handling system. If the total load being lifted by the hoists exceeds the rated load capacity for the material handling system, a fault is set by the motor drive detecting the condition and the fault is transmitted to each of the motor drives operating in tandem to perform the lift.

According to one embodiment of the invention, a method of detecting a magnitude of a load applied to a hoisting motor in a material handling system using a motor drive controlling the motor is disclosed. A first parameter and a second parameter are stored in the motor drive, where the first parameter defines an expected level of torque produced by the hoisting motor at a first speed with no load and the second parameter defines an expected level of torque produced by the hoisting motor at a second speed with no load. The second speed is greater than the first speed. A third parameter and a fourth parameter are stored in the motor drive, where the third parameter defines an expected level of torque produced by the hoisting motor at the first speed with a rated load and the fourth parameter defines an expected level of torque produced by the hoisting motor at the second speed with the rated load. The speed of rotation of the hoisting motor is measured and a processor in the motor drive determines an expected level of torque produced by the hoisting motor at the measured speed with no load as a function of the first parameter and the second parameter. The processor also determines an expected level of torque produced by the hoisting motor at the measured speed with rated load as a function of the third parameter and the fourth parameter. A magnitude of torque generated by the hoisting motor at the measured speed is determined, and the processor determines the magnitude of the load applied to the hoisting motor at the measured speed and measured torque as a function of the expected level of torque produced by the hoisting motor at the measured speed with no load and the expected level of torque produced by the hoisting motor at the measured speed with rated load. Each of the steps may be repeated within a periodic interval while the hoisting motor is running.

According to another aspect of the invention, the motor drive may operate with either an open or closed loop on position feedback. The motor drive may use an internal speed reference signal to measure the speed of rotation of the hoisting motor, or a position feedback device may be operatively coupled to the hoisting motor and generate a signal corresponding to an angular position of the hoisting motor. The motor drive measures the speed of rotation of the hoisting motor as a function of the change in the signal corresponding to the angular position of the hoisting motor with respect to time.

According to still another aspect of the invention, the motor drive stores a first set of parameters and a second set of parameters. Each of the first and second sets of parameters includes a first parameter, a second parameter, a third parameter, and a fourth parameter. The first set of parameters defines expected levels of torque produced by the motor while the motor is running at a constant speed at each of the first and second speeds, and the second set of parameters defines expected levels of torque produced by the motor while the motor is accelerating through or approaching each of the first and second speeds.

According to yet another aspect of the invention, the motor drive may execute one or more commissioning runs. During a first run at the first speed with no load, either a current or a torque output by the motor drive is measured. During a second run at the second speed with no load, either the current or the torque output by the motor drive is measured. During a third run at the first speed with the rated load, either the current or the torque output by the motor is measured. During the fourth run at the second speed with the rated load, either the current or the torque output by the motor drive is measured. During each of the first, second, third, and fourth runs a torque required by the motor is determined as a function of the measured current or torque. The torque required by the motor during each of the first, second, third, and fourth runs is stored in the first, second, third, and fourth parameters, respectively, of the first set of parameters. During a fifth run between the first speed and the second speed with no load, either the current or the torque output by the motor drive is measured. During a sixth run between the first speed and the second speed with the rated load, either the current or the torque output by the motor drive is measured. During each of the fifth and sixth runs the torque required by the motor while accelerating at about each of the first and second speeds is determined as a function of the measured current or torque. The torque required by the motor while accelerating at about each of the first and second speeds during the fifth run is stored in the first and second parameters, respectively, of the second set of parameters. The torque required by the motor while accelerating at about each of the first and second speeds during the sixth run is stored in the third and fourth parameters, respectively, of the second set of parameters.

According to another embodiment of the invention, a motor drive for a hoisting motor is disclosed. The motor drive includes a plurality of power terminals configured to receive one of alternating current (AC) or direct current (DC) input power from an external power source, a power conversion section is configured to transfer the input power to output power to the hoisting motor, where the output power includes at least one of a controlled current and a controlled voltage. The motor drive also includes at least one input terminal configured to receive a command signal corresponding to a desired speed of the motor, at least one current sensor configured to generate a signal corresponding to an amplitude of the current output to the motor, a memory device configured to store a plurality of instructions and a plurality of parameters, and a processor. The processor is configured to execute the plurality of instructions to read a first, second, third, and fourth parameter from the plurality of parameters. The first parameter defines an expected level of torque produced by the hoisting motor at a first speed with no load. The second parameter defines an expected level of torque produced by the hoisting motor at a second speed with no load, and the second speed is greater than the first speed. The third parameter defines an expected level of torque produced by the hoisting motor at the first speed with a rated load, and the fourth parameter defines an expected level of torque produced by the hoisting motor at the second speed with the rated load. A speed of rotation of the hoisting motor is measured and the processor determines an expected level of torque produced by the hoisting motor at the measured speed with no load as a function of the first parameter and the second parameter. The processor also determines an expected level of torque produced by the hoisting motor at the measured speed with rated load as a function of the third parameter and the fourth parameter. A magnitude of torque generated by the hoisting motor at the measured speed is determined, and the processor determines the magnitude of the load applied to the hoisting motor at the measured speed and measured torque as a function of the expected level of torque produced by the hoisting motor at the measured speed with no load and the expected level of torque produced by the hoisting motor at the measured speed with rated load.

According to still another embodiment of the invention, a method of determining a magnitude of a load applied to a material handling system when the load is lifted using a plurality of hoisting motors and each hoisting motor is controlled by a separate motor drive is disclosed. A load applied to a first hoisting motor, selected from the plurality of hoisting motors, is measured with a first motor drive controlling the first hoisting motor and the measured load applied to the first hoisting motor is converted to a first measured load applied to the material handling system. A signal corresponding to the first measured load applied to the material handling system is transmitted from the first motor drive to a second motor drive, the second motor drive controlling a second hoisting motor selected from the plurality of hoisting motors. A load applied to the second hoisting motor is measured with the second motor drive, and the measured load applied to the second hoisting motor is converted to a second measured load applied to the material handling system. The first measured load applied to the material handling system is summed to the second measured load applied to the material handling system in the second motor drive to determine a total load applied to the material handling system.

According to another aspect of the invention, the load applied to the material handling system may be lifted using at least three hoisting motors. A signal corresponding to the sum of the first and second loads applied to the material handling system may be transmitted from the second motor drive to a third motor drive, the third motor drive controlling a third hoisting motor selected from the plurality of hoisting motors. A load applied to the third hoisting motor is measured with the third motor drive, and the measured load applied to the third hoisting motor is converted to a third measured load applied to the material handling system. The third measured load applied to the material handling system is summed to the signal corresponding to the sum of the first and second loads applied to the material handling system in the third motor drive to determine the total load applied to the material handling system.

According to yet another aspect of the invention, the total load applied to the material handling system may be compared to a maximum load for the material handling system in the second motor drive, and a fault signal in the second motor drive may be generated when the total load applied to the material handling system is greater than the maximum load for the material handling system.

According to another embodiment of the invention, an overload detection system for a material handling system including a plurality of hoisting motors to lift a load is disclosed. The overload detection system includes a plurality of motor drives, where each motor drive is operatively connected to control operation of one of the plurality of hoisting motors. Each motor drive includes an input operable to receive a signal corresponding to a total weight of the load transmitted from one of the other motor drives, an output operable to transmit a new total weight of the load as determined by the motor drive, a memory device storing a plurality of instructions and a plurality of parameters, and a processor. The processor is operable to execute the plurality of instructions to measure a load applied to the hoisting motor operatively connected to the motor drive, convert the measured load applied to the hoisting motor to a measured load applied to the material handling system by the motor drive, add the measured load applied to the material handling system by the motor drive to the signal corresponding to the total weight of the load as received from one of the other motor drives to determine the new total weight of the load, and transmit the new total weight of the load from the output.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
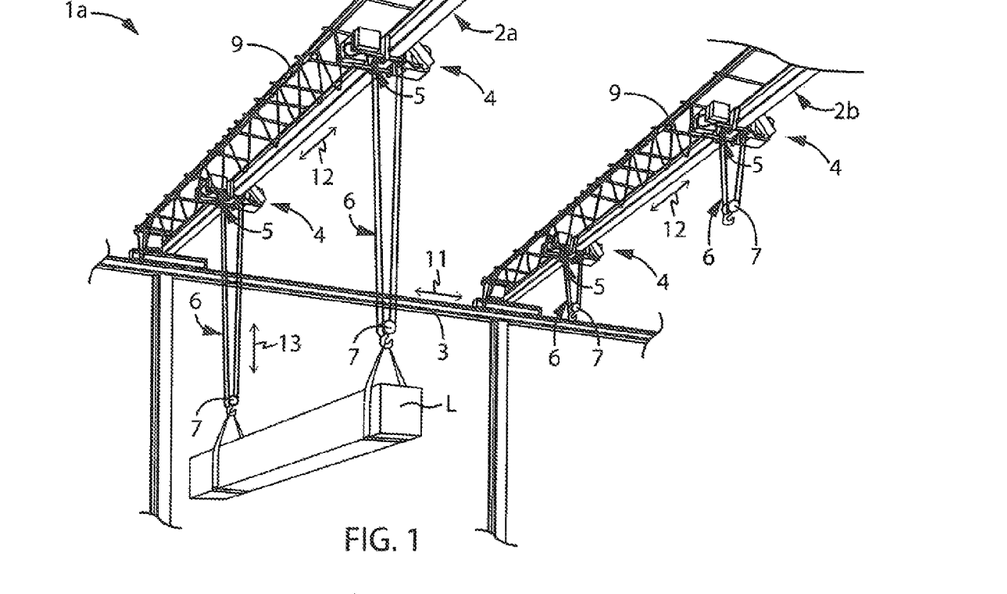
FIG. 1 is one exemplary environment incorporating an embodiment of the present invention.

Turning initially to FIGS. 1 and 2, two exemplary embodiments of material handling systems 1a, 1b incorporating the present invention are illustrated. According to the embodiment illustrated in FIG. 1, the material handling system 1a includes two bridges 2. Each bridge 2 is configured to move in a first axis of motion 11 along a pair of rails 3 located at either end of the bridges 2. One of the illustrated bridges 2a includes a pair of trolleys 4, where each trolley 4 is configured to move along the bottom of the first bridge 2a in a second axis of motion 12, generally perpendicular to the first axis of motion 11 and along the length of the first bridge 2a. The second bridge 2b may include a single trolley 4 or multiple trolleys. One or more sheaves 5, also referred to as drums, may be mounted to each trolley 4, around which a cable 6 is wound. The sheave 5 may be rotated in either direction to wind or unwind the cable 6 around the sheave 5. The cable 6 is operatively connected to a hook block or any other lifting fixture 7 such that the hook block may be connected to a load, L, and move in a third axis of motion 13, generally perpendicular to each of the first and the second axes of motions, 11 and 12. One or more control cabinets housing, for example, motor controllers 40 (see e.g., FIG. 3) and/or an industrial controller, such as a programmable logic controller (PLC), may be mounted on the floor, and wiring may be run between the control cabinets and each trolley 4. The wiring may consist of a festoon system 9, conductor bars, cables in a cable tray or any other suitable system for conducting power and control signals between the control cabinets and each trolley 4.

Figure 2:
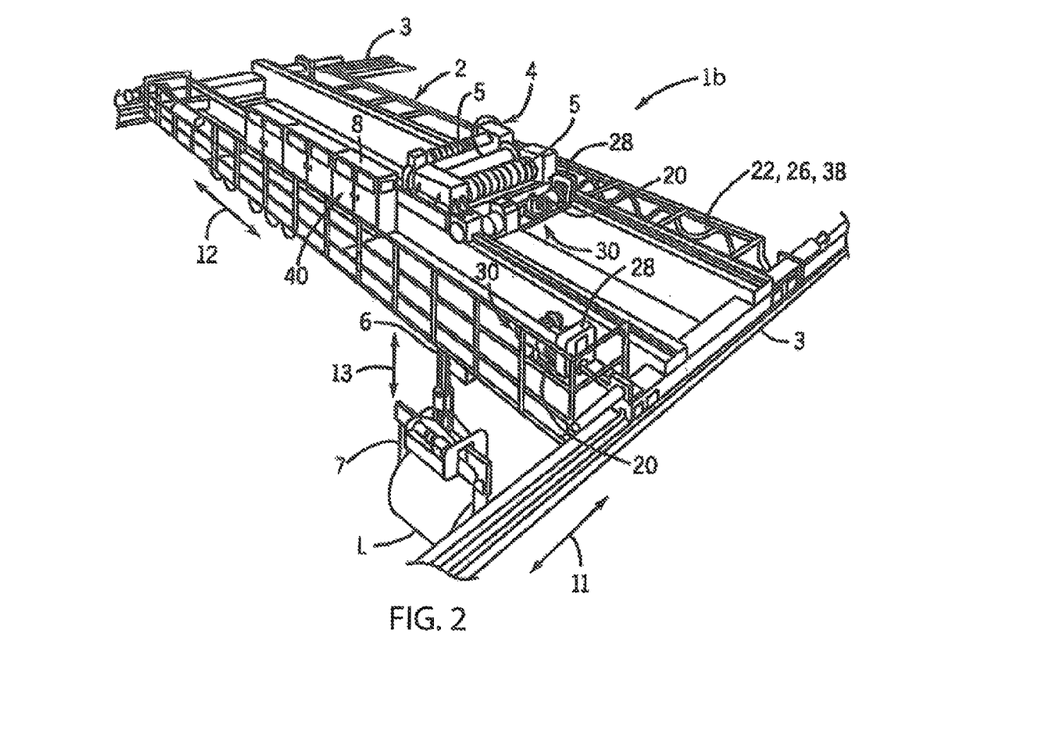
FIG. 2 is another exemplary environment incorporating an embodiment of the present invention.

According to the embodiment illustrated in FIG. 2, the material handling system 1b may include a single bridge 2, where the bridge 2 is configured to move in a first axis of motion 11 along a pair of rails 3 located at either end of the bridge 2. As illustrated, a single trolley 4 is mounted on and configured to move along the top of the bridge 2 in a second axis of motion 12, generally perpendicular to the first axis of motion 11, along the length of the bridge 2. It is contemplated that multiple trolleys 4 may be mounted to the bridge 2. One or more control cabinets 8 housing, for example, the motor controllers 40 are mounted on the bridge 2 and wiring may be run between the motor controller (40) and the respective motor 20 (see e.g., FIG. 3) being controlled. The wiring may consist of a festoon system, conductor bars, cables in a cable tray or any other suitable system for conducting power and control signals between the control cabinets 8 and each device in the material handling system 1.

Figure 3:
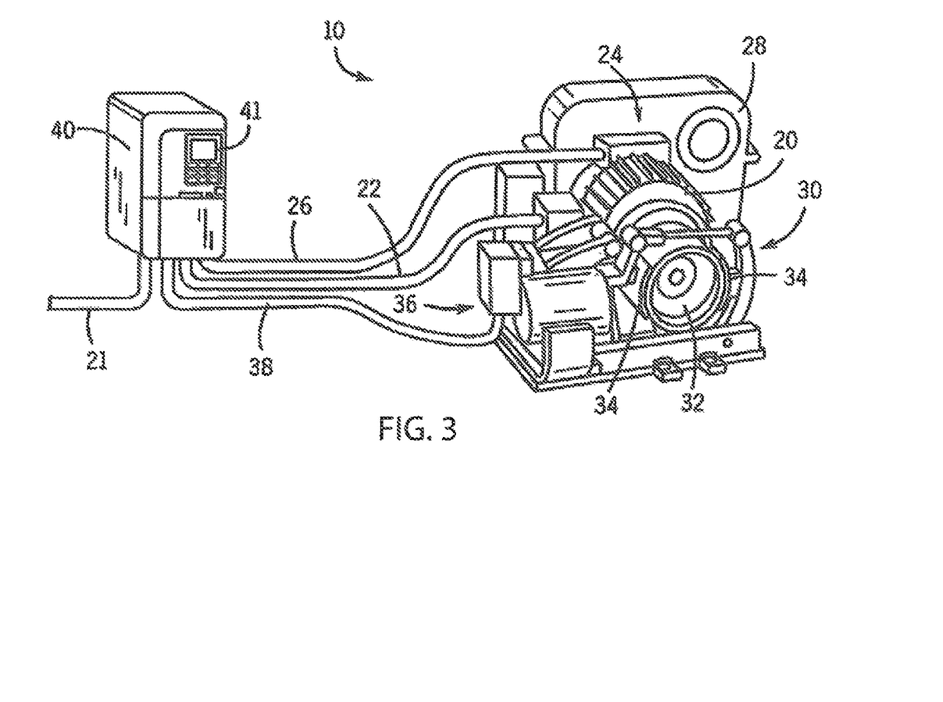
FIG. 3 is a schematic representation of an exemplary motor controller incorporating an embodiment of the present invention, where the motor drive is connected to a motor and gearbox.

Referring next to FIG. 3, an exemplary portion of the drive system 10 for one axis of motion in the material handling system 1 is illustrated. The exemplary portion of the drive system 10 includes a motor 20 controlled by a motor controller 40, also referred to herein as a motor drive. The motor controller 40 delivers a regulated voltage and/or current to the motor 20 via a set of electrical conductors 22. The magnitude and/or frequency of the voltage or current may be varied to control the speed at which the motor 20 rotates, the torque produced by the motor 20, or a combination thereof. A feedback device 24, such as an encoder or a resolver, is connected to the motor, typically by mounting the feedback device 24 to the output shaft at one end of the motor 20. The feedback device 24 provides to the motor controller 40, via electrical conductors 26, any suitable electrical signal, corresponding to rotation of the motor 20, as would be known in the art. A gearbox 28 may be connected to the output shaft of the motor 20 for rotating any suitable drive member at a desired speed according to the requirements of the axis of motion to which the gearbox 28 is connected. Optionally, the motor 20 may be configured to directly rotate the drive member.

A braking unit 30 is supplied to prevent undesired rotation of the motor 20. As illustrated in FIG. 3, one embodiment of the braking unit 30 includes a brake wheel 32 mounted to a shaft extending from the motor 20. Brake shoes 34 engage opposite sides of the brake wheel 32. A brake controller 36 selectively engages and disengages the brake shoes 34 to the brake wheel 32. The brake controller 36 may be, but is not limited to, an electric or a hydraulic controller receiving a command signal from the motor controller 40 via an electrical conductor 38. Optionally, the braking unit 30 may include, for example, a disc attached to the motor and employee brake pads to engage the disc. It is contemplated that numerous other configurations of brakes may be employed without deviating from the scope of the present invention. According to still other embodiments, the braking unit 30 may be connected at any suitable location along the drive system 10 to prevent motion of the commanded axis according to application requirements.

The exemplary embodiments of material handling systems 1a, 1b illustrated in FIGS. 1 and 2 are not intended to be limiting. The present invention may be incorporated into material handling systems 1 having numerous configurations or combinations of elements either illustrated in or in addition to those illustrated in FIGS. 1 and 2 according to the application requirements without deviating from the scope of the invention. For example, the trolleys may be under-hung, or top-mount. The material handling system may have a single bridge or multiple bridges. A single trolley or multiple trolleys may be mounted on each bridge. Each trolley may include a single hoist and hoist motor or multiple hoists and hoist motors. Different trolleys, bridges, and/or hoists may be configured to operate asynchronously, synchronously, or selectively operate either synchronously or asynchronously. The material handling systems may utilize load handling members, including but not limited to a block and hook, a bucket, a clam-shell attachment, or a magnet. Similarly, the present invention may be incorporated into winch-type applications which may spool out and reel in a cable along a more horizontal plane, including but not limited to a winch, a dredge, an anchor, or other side-pull systems.

The following definitions will be used to describe exemplary material handling systems throughout this specification. As used herein, the terms "raise" and "lower" are intended to denote the operations of letting out or reeling in a cable 6 connectable to a load handling member 7 of a material handling system 1 and are not limited to moving a load, L, in a vertical plane. The load handling member 7 may be any suitable device for connecting to or grabbing a load, including, but not limited to, a hook block, a bucket, a clam-shell, a grapple, or a magnet. While an overhead crane may lift a load vertically, a winch may pull a load from the side. Further, an appropriately configured load handling member 7 may allow a load to unwind cable or may reel in the load by winding up the cable at any desired angle between a horizontal plane and a vertical plane.

The "cable," also known as a "rope," may be of any suitable material. For example, the "cable" may be made from, but is not limited to, steel, nylon, plastic, other metal or synthetic materials, or a combination thereof, and may be in the form of a solid or stranded cable, chain links, or any other combination as is known in the art.

A "run" is one cycle of operation of the motor controller 40. The motor controller 40 controls operation of the motor 20, rotating the motor 20 to cause the cable 6 to wind around or unwind from the sheave 5. A "run" may include multiple starts and stops of the motor 20 and, similarly it may require multiple "runs" to let the cable 6 fully unwind or wind completely around the sheave 5. Further, the cable 6 need not be fully unwound from or wound around the sheave 5 before reversing direction of rotation of the motor 20. In addition, direction of rotation of the motor 20 may be reversed within a single run.

Figure 4:
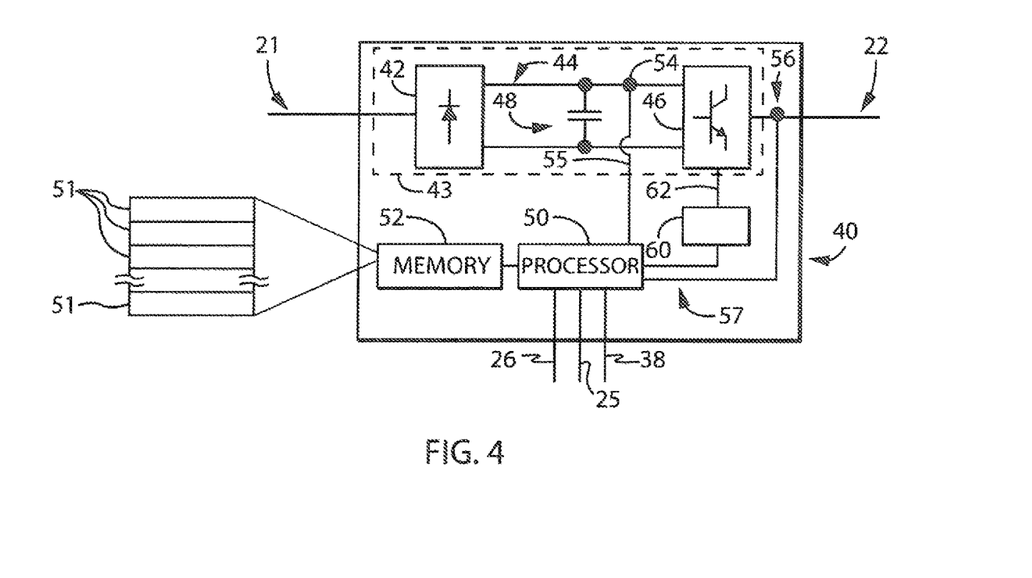
FIG. 4 is a block diagram of the exemplary motor controller of FIG. 3.

Referring next to FIG. 4, the motor controller 40 receives a command signal 25 from any suitable operator interface. The operator interface may be, but is not limited to, a keypad 41 mounted on the motor controller 40, a remote industrial joystick with a wired connection to the motor controller 40, or a radio receiver connected to the motor controller receiving a wireless signal from a corresponding radio transmitter. The motor controller 40 includes an input 21, for example, one or more terminals, configured to receive power, which may be a single or multiple phase alternating current (AC) or a direct current (DC) power source. A power conversion section 43 of the motor controller 40 converts the input power 21 to a desired power at an output 22 configured to connect to the motor 20. The output 22 may similarly be a single or multiple phase AC or a DC output, according to the application requirements. According to the illustrated embodiment, the power conversion section 43 includes a rectifier section 42 and an inverter section 46, converting a fixed AC input to a variable amplitude and variable frequency AC output. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The input power 21 is converted to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor controller 40. An inverter section 46 converts the DC voltage on the DC bus 44 to the desired output power 22 for the motor 20 according to switching signals 62.

The motor controller 40 further includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single or multiple electronic devices, including static memory, dynamic memory, or a combination thereof. The memory device 52 preferably stores parameters 51 of the motor controller 40 and one or more programs, which include instructions executable on the processor 50. The parameters 51 may, for example, configure operation of the motor controller 40 or store data for later use by the motor controller 40.

Figure 5:
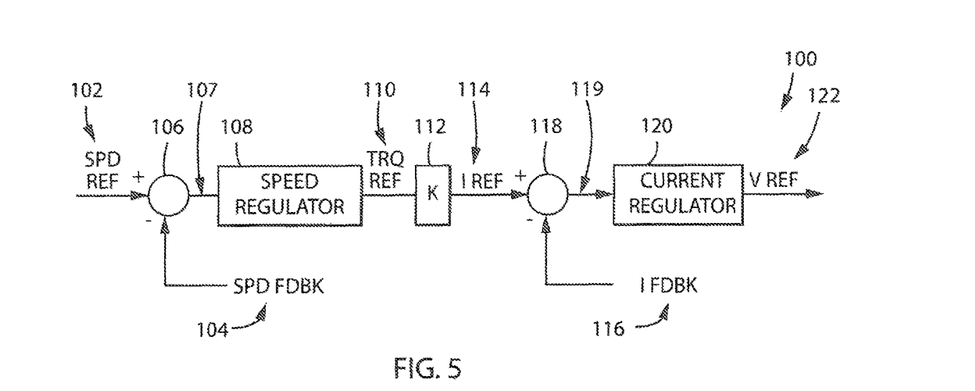
FIG. 5 is a block diagram representation of a control module executing on the exemplary motor controller of FIG. 4.

Referring also to FIG. 5, the processor 50 is configured to execute a motor control module 100 to generate a voltage reference 122 to the motor 20 corresponding to the necessary amplitude and frequency to run the motor 20 and the desired speed reference 102. The motor 20 may include a position sensor 24 connected to the motor controller 40 via an electrical connection 26 to provide a position feedback signal corresponding to the angular position of the motor 20. The processor 50 determines a speed feedback signal 104 as a function of the rate of change of the position feedback signal over time. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor controller 40, respectively. The switching signals 62 may be determined by an application specific integrated circuit 60 receiving reference signals from a processor 50 or, optionally, directly by the processor 50 executing the stored instructions. The switching signals 62 are generated, for example, as a function of the feedback signals, 55 and 57, received at the processor 50.

In operation, the processor 50 receives a command signal 25 indicating a desired operation of the corresponding motor 20 in the material handling system 1 and provides a variable amplitude and frequency output voltage 22 to the motor 20 responsive to the command signal 25. The command signal 25 is received by the processor 50 and converted, for example, from discrete digital signals or an analog signal to an appropriately scaled speed reference 102 for use by the motor control module 100. If closed loop operation of the motor drive 40 is desired, where closed loop operation includes a speed feedback signal 104, the speed reference 102 and the speed feedback signal 104 enter a summing junction 106, resulting in a speed error signal 107. The speed feedback signal 104 may be derived from a position feedback signal generated by the position sensor 24. Optionally, the speed feedback signal 104 may be derived from an internally determined position signal generated, for example, by a position observer. The speed error signal 107 is provided as an input to a speed regulator 108. The speed regulator 108, in turn, determines the required torque reference 110 to minimize the speed error signal 107, thereby causing the motor 20 to run at the desired speed reference 102. If open loop operation of the motor drive 40 is desired, where open loop operation does not include a speed feedback signal, the speed reference signal 102 may be scaled directly to a torque reference 110 that would result in the motor 20 operating at the desired speed reference 102. A scaling factor 112 converts the torque reference 110 to a desired current reference 114. The current reference 14 and a current feedback signal 116, derived from a feedback signal 57 measuring the current present at the output 22 of the motor drive 40, enter a second summing junction 118, resulting in a current error signal 119. The current error signal is provided as an input to the current regulator 120. The current regulator 120 generates the voltage reference 122 which will minimize the error signal 119, again causing the motor 20 to run at the desired speed reference 102. This voltage reference 122 is used to generate the switching signals 62 which control the inverter section 46 to produce a variable amplitude and frequency output voltage 22 to the motor 20.

During operation, the motor controller 40 may utilize current feedback signals 57 and/or reference signals, for example, the torque reference 110 to determine a level of torque produced by the motor 20. As indicated by the scaling factor 112 present in the control module 100 the torque produced by the motor is generally proportional to the current, or at least a portion thereof, output by the motor 20. As is understood in the art, a three-phase current may be converted by Park's transform to a torque producing component, also referred to as a q-axis current, and a flux producing component, also referred to as a d-axis current. The q-axis current is proportional to the torque produced by the motor and, therefore, may be used to determine a level of torque produced by the motor. Optionally, any suitable internal reference or measured feedback signal that may be converted to a torque reference or torque feedback signal may be utilized to determine the level of torque being produced by the motor 20.

During commissioning of the hoist, the motor controller 40 may execute a number of commissioning runs to determine the values for each of the parameters 51 to be used during load weight measurement. An initial sequence of runs may be used to determine torque levels expected during constant speed operation of the motor 20. The hoist is initially operated in an unloaded condition. Although the hoist is unloaded, the hoist motor 20 still experiences some level of load. The hoist motor 20 must drive, for example, a gear box, a sheave connected to the output of the gear box (or connected to the motor if in a direct-drive configuration), the weight of the ropes wound around the sheave and the weight of a hook block connected to the end of the ropes. Thus, while the hoist is unloaded, the hoist motor 20 experiences some load. The hoist motor 20 is then run at a first speed in the unloaded condition. The first speed is at the low end of the expected range of operation for the motor 20 and may be, for example, between about two and ten hertz. Preferably, the first speed is set to about six hertz. The hoist motor 20 is then run at a second speed in the unloaded condition. The second speed is at the upper end of the expected range of operation of the motor 20 and may be, for example, at the rated speed of operation for the hoist motor 20. The motor controller 40 then executes another commissioning run again at each of the first and second speeds with the hoist having a rated load.

Figure 7:
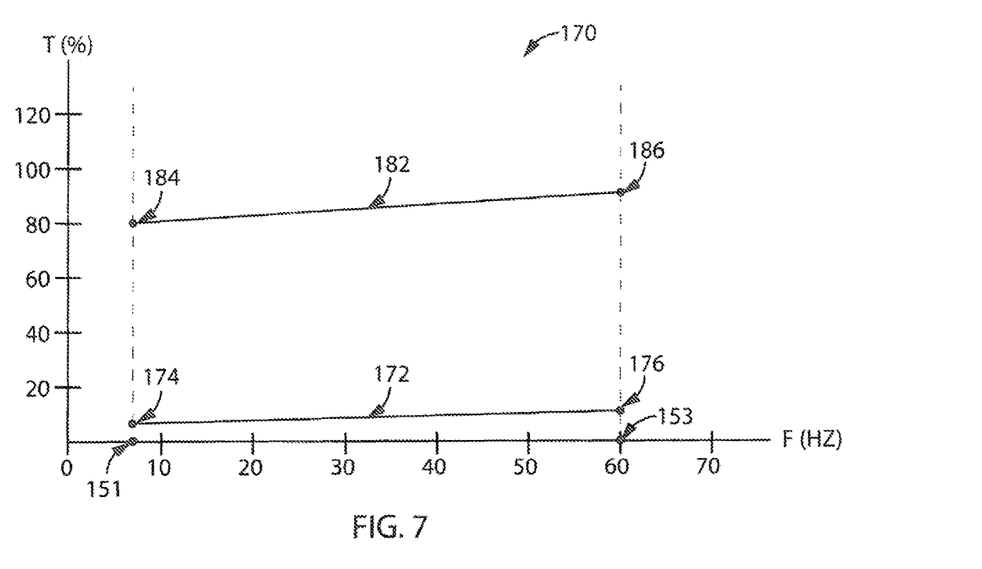
FIG. 7 is a graphical representation of the torque produced by an exemplary hoisting motor while running at a constant speed between a first speed and rated speed in a loaded and unloaded condition.

With reference now to FIG. 7, the torque generated by the motor 20 during each of the commissioning runs may be stored in parameters 51 for later use to determine the weight of the load connected to the hoist. A first level of torque 174 produced by the motor 20 when running at the first speed 151 in an unloaded condition is stored in a first parameter 51 and a second level of torque 176 produced by the motor 20 when running at the second speed 153 in an unloaded condition is stored in a second parameter SI. A third level of torque 184 produced by the motor 20 when running at the first speed 151 in a loaded condition is stored in a third parameter 51 and a fourth level of torque 186 produced by the motor 20 when running at the second speed 153 in a loaded condition is stored in a fourth parameter 51.

After performing the commissioning runs for operation at a constant speed, the motor controller 40 may execute a number of additional commissioning runs to monitor the torque generated by the motor during acceleration. The additional commissioning runs may be performed by accelerating from zero speed up to rated speed. Optionally, the hoist motor 20 may start operating at any speed below the first speed and accelerate through the first speed. As with the commissioning runs performed at constant speed, the hoist is initially operated in an unloaded condition. As the motor 20 accelerates through the first speed, the motor controller 40 monitors the torque. A user configurable range of speeds may be defined around the first speed for which the motor controller 40 monitors the torque, and an average value of the torque during this speed range may be stored. The motor 20 continues to accelerate up to the second speed. If the second speed selected for the constant speed runs was rated speed, the motor controller 40 will typically decelerate the motor 20 as it approaches rated speed and continue operating at rated speed. According to one embodiment of the invention, the motor controller 40 may be configured to accelerate through rated speed when operating in an unloaded condition. A user configurable range of speeds may be defined around the second speed for which the motor controller 40 monitors the torque, and an average value of the torque during this speed range may be stored. According to another embodiment of the invention, the motor controller 40 may monitor the torque over a speed range less than the second speed and prior to beginning to decelerate to the second speed. For example, if the second speed is rated speed and equal to sixty hertz, the speed range may be defined from about fifty-four hertz to about fifty-seven hertz. The motor controller 40 monitors the torque for acceleration throughout the second speed range prior to decelerating the motor, and an average value of the torque during this speed range may be stored. If the second speed selected for the constant speed was less than rated speed, the motor controller 40 may utilize either method of monitoring torque, that is, monitoring for a range of speeds defined around the second speed or monitoring for a range of speeds prior to decelerating to the second speed. The motor controller 40 then executes another commissioning run again at each of the first and second speeds with the hoist having a rated load.

Figure 6:
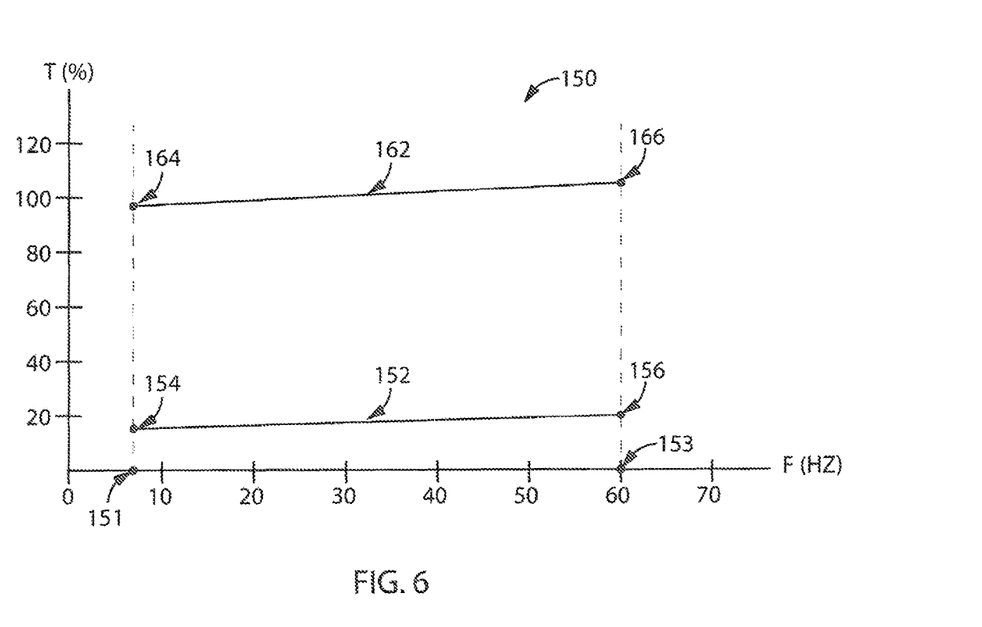
FIG. 6 is a graphical representation of the torque produced by an exemplary hoisting motor during acceleration up to rated speed in a loaded and unloaded condition.

With reference next to FIG. 6, the torque generated by the motor 20 during each of the commissioning runs may be stored in parameters 51 for later use to determine the weight of the load connected to the hoist. A first level of torque 154 produced by the motor 20 when accelerating through the first speed 151 in an unloaded condition is stored in a first parameter 51 and a second level of torque 156 produced by the motor 20 when accelerating through or approaching the second speed 153 in an unloaded condition is stored in a second parameter 51. A third level of torque 164 produced by the motor 20 when accelerating through the first speed 151 in a loaded condition is stored in a third parameter 51 and a fourth level of torque 166 produced by the motor 20 when accelerating through or approaching the second speed 153 in a loaded condition is stored in a fourth parameter 51. Thus, the motor controller 40 stores two sets of parameters, where one set of parameters includes torque values expected when the motor 20 is operating at constant speed and the second set of parameters includes torque values expected when the motor is accelerating.

Figure 8:
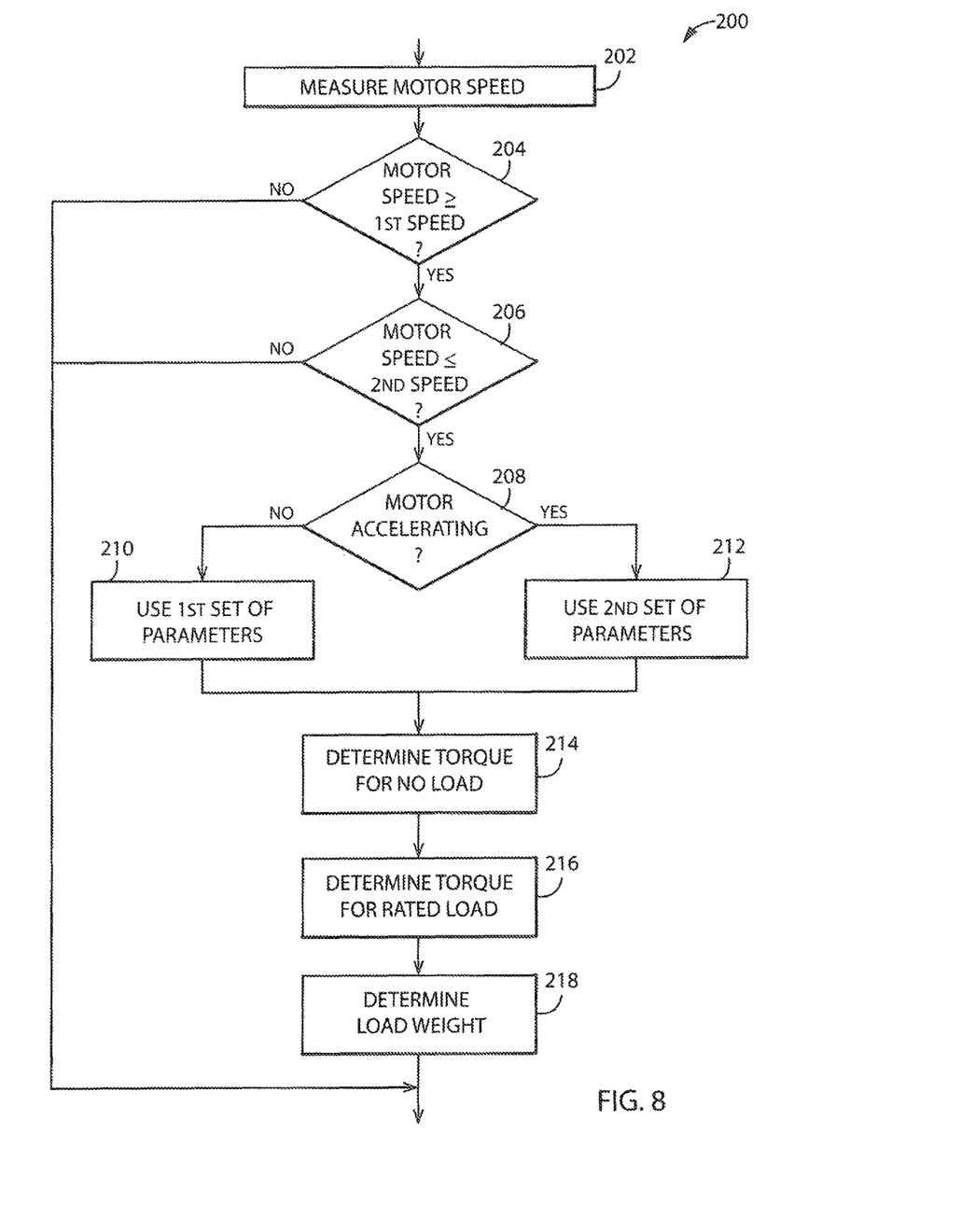
FIG. 8 is a flowchart illustrating the steps for determining the weight of a load connected to a hoisting motor according to one embodiment of the invention.

Turning next to FIG. 8, the processor 50 of the motor controller 40 executes a weight measurement module 200, according to one embodiment of the invention, to determine the weight of the load present on the hoist. At step 202, the motor controller 40 measures the motor speed. If the motor controller 40 is operating in a closed loop manner, the speed may be determined from the position feedback signal generated by the position sensor 24. If the motor controller 40 is operating in an open loop manner, the speed may be determined, for example, from a speed observer generating an estimated speed of the motor 20 or, optionally, by using a speed reference signal. At step 204, the motor speed is compared to the first speed 151. If the motor speed is less than the first speed 151, then the motor 20 is not operating fast enough and the motor controller 40 jumps to the end of the weight measurement module 200. If the motor speed is greater than or equal to the first speed 151, the motor speed is than compared to the second speed 153, as shown in step 206. If the motor speed is greater than the second speed 153, the motor controller 40 again jumps to the end of the weight measurement module 200.

If the motor speed is equal to or less then the second motor speed 153 and greater than or equal to the first speed 151, the weight measurement module 200 then determines the weight of the load present on the hoist. As seen in step 208, the weight measurement module 200 first determines whether the motor controller 40 is accelerating or operating at a steady speed. If the motor controller is running at constant speed, the weight measurement module 200 uses the first set of parameters 51, as discussed above, which include torque values expected when the motor 20 is operating at constant speed, as shown in step 210. If the motor controller 40 is commanding the motor 20 to accelerate, the weight measurement module 200 uses the second set of parameters 51, as discussed above, which include torque values expected when the motor 20 is accelerating, as shown in step 212.

At step 214, the weight measurement module 200 determines the torque expected at no load based on the speed at which the motor 20 is operating. If the motor 20 is running at constant speed, the motor controller 40 reads the first torque value 174 and the second torque value 176 from the first set parameters, and if the motor 20 is accelerating, the motor controller 40 reads the first torque value 154 and the second torque value 156 from the second set parameters. The weight measurement module 200 then interpolates between the first and second torque values to determine an expected torque at the speed at which the motor is operating. As shown in FIGS. 6 and 7, a first set of torque values 172 results when the motor is running at constant speed and a second set of torque values 152 results when the motor is accelerating. The motor controller 40 selects the torque value from among the respective set of torque values 172, 152 that corresponds to the speed at which the motor is running.

At step 216, the weight measurement module 200 similarly determines the torque expected at rated load based on the speed at which the motor 20 is operating. If the motor 20 is running at constant speed, the motor controller 40 reads the third torque value 184 and the fourth torque value 186 from the first set parameters, and if the motor 20 is accelerating, the motor controller 40 reads the third torque value 164 and the fourth torque value 166 from the second set parameters. The weight measurement module 200 then interpolates between the third and fourth torque values to determine an expected torque at the speed at which the motor is operating. As shown in FIGS. 6 and 7, a third set of torque values 182 results when the motor is running at constant speed and a fourth set of torque values 162 results when the motor is accelerating. The motor controller 40 selects the torque value from among the respective set of torque values 182, 162 that corresponds to the speed at which the motor is running.

At step 218, the weight measurement module 200 uses the sets of torque values 152, 162, 172, 182 determined in the prior steps to determine the weight of the load present on the hoist. The motor controller 40 determines the level of torque presently being generated by the motor 20. The weight measurement module 200 then determines where the present level of torque falls between the level of torque expected at no load (i.e., zero percent) and at rated load (i.e., one hundred percent) for the current speed of operation to determine what percent of load is present on the hoist system. By comparing the present level of torque to the expected torque values 152, 162, 172, 182, the motor controller 40 compensates for the torque required to control the mechanics of the hoist motor 20 and associated drive train and determines a load weight for just the load connected to the hoist. Further, the motor controller 40 is configured to execute the weight measurement module 200 at a periodic interval. Within each periodic interval, the weight measurement module 200 is executed once and a new load weight is determined. Thus, if the weight of the load changes during the run, the motor controller 40 is able to detect the change.

Although the method of determining weight measurement has been discussed with respect to a specific sequence as disclosed in FIG. 8, it is understood that various steps disclosed in FIG. 8 may be executed in different orders without deviating from the scope of the invention.

During some lifting operations, it may be necessary to utilize two or more hoists to lift a load. This may be due, for example, to the length or weight of a load. As shown in FIG. 1, a single bridge 2 may include multiple trolleys 4, where each trolley 4 includes a hoist. A first trolley 4 may be positioned near one end of the load, L, and a second trolley 4 may be positioned near the other end of the load, L. A sling, spreader bar, or other lifting member may be connected to each hook 7 and around the load, L. The hoists on each trolley 4 are operated in tandem to lift the load, L. Similarly, a hoist on a trolley 4 of a first bridge 2 and another hoist on a trolley 4 of a second bridge 2 may each be positioned proximate one end of a load, L, and each hoist, trolley 4, and bridge 2 operated in tandem to move the load, L.

During a lifting operation with multiple hoists, both the rated capacity of the hoist as well as the rated capacity of the material handling system 1 must be considered. If, for example, a bridge 2 includes two trolleys 4 and two hoists, one of the hoists may be configured to lift a load up to the rated load of the bridge 2. The other of the hoists may be configured to lift a load up to one-half the rated load of the bridge 2. In this manner, the bridge has the flexibility to lift up to its rated capacity either with a single hoist or with both hoists operating in tandem.

According to an exemplary hoisting application, the bridge 2 may be rated to lift a load up to one hundred tons. The first hoist may similarly be rated to lift a load up to one hundred tons, and the second hoist may be rated to lift a load up to fifty tons. If a load has even weight distribution, then each hoist's individual load check functions are suitable to detect an overload of the material handling system 1. When the load exceeds one hundred tons and the weight is evenly distributed, the load seen by the fifty ton hoist will exceed fifty tons and its load check function can detect the overload condition. However, if a load has uneven weight distribution, the one hundred ton hoist may lift, for example, seventy tons and the fifty ton hoist may lift forty-five tons. Each hoist is within its rated capacity; however, the total load is one hundred fifteen tons, exceeding the rated capacity for the bridge 2.

Figure 9:
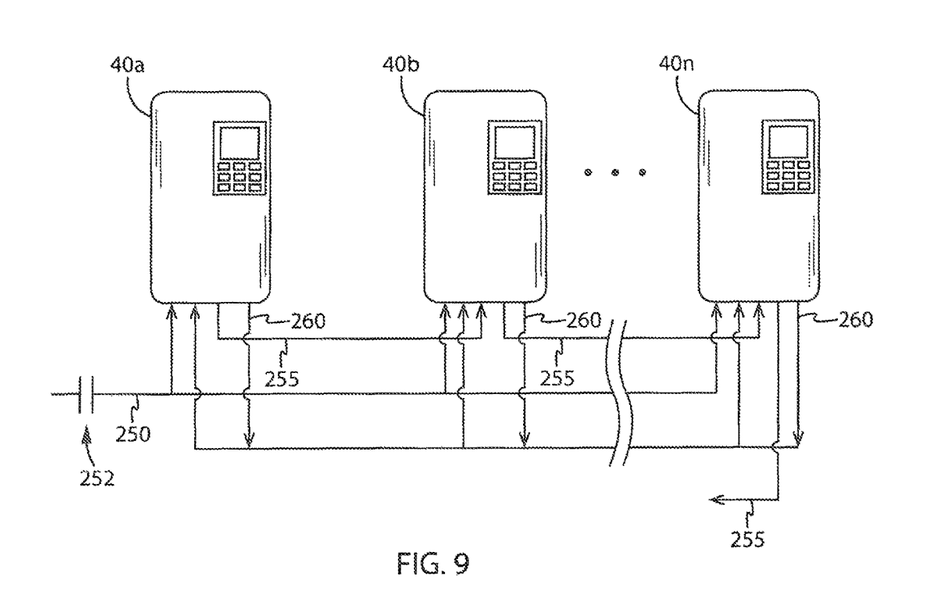
FIG. 9 is a schematic representation of multiple motor controllers interconnected to determine the total weight of a load being lifted by multiple hoists in tandem, where teach of the hoists is controlled by one of the motor controllers.

Turning next to FIG. 9, an exemplary arrangement of multiple motor drives 40, each controlling a different hoist motor 20, for use in a multiple hoist lifting operation is configured to detect the total weight of the load. Although three motor drives 40a, 40b, 40n are illustrated, it is contemplated that any number of motor drives 40 may be configured to operate in tandem to lift a load. Each additional motor drive 40 could be inserted between the second motor drive 40b and the last motor drive 40n and wired in a manner similar to the second motor drive 40b. Each motor drive 40 receives an input signal 250 to enable total system weight measurement. A contact 252 may be controlled by a separate system controller that enables/disables the total system weight measurement, allowing the function to run, for example, only when a multiple hoist lift is being performed. Optionally, the motor drive 40 may be configured to always execute total system weight measurement. Each motor drive 40 determines the weight of the load being lifted by the hoist and corresponding hoist motor 20 being controlled by the motor drive 40. It is contemplated that each motor drive 40 utilizes the load weight measurement system and method as discussed in detail above. Optionally, each motor drive 40 may utilized other load weight measurement systems and/or methods to determine the weight of the load present on the motor 20 being controlled by the motor drive 40.

The motor drives 40 are further configured to utilize the various load weights measured by each motor drive 40 to determine a total weight of the load present on the material handling system 1. Each motor drive 40 outputs a cumulative load weight signal 255. One of the motor drives 40 is selected as a first motor drive, and according to the illustrated embodiment in FIG. 9, motor drive 40a is the first motor drive. Because motor drive 40a is the first motor drive, it receives no load measurement information from other motor drives 40. Consequently, the first motor drive 40a outputs just the weight of the load present on the motor 20 being controlled by the motor drive 40 as the cumulative load weight signal 255. The cumulative load weight signal 255 from the first motor drive 40a is then provided as an input to the second motor drive 40b. The second motor drive 40b adds the load weight from the first motor drive 40a to the load weight determined by the second motor drive 40b to determine a cumulative load weight for the load being lifted. The second motor drive 40b similarly transmits the newly determined value of the load as a cumulative load weight signal 255 from the second motor drive 40b to the next motor drive 40 in the chain. Each motor drive 40 is similarly connected to the next motor drive 40 in a daisy chain configuration, and each motor drive 40 participating in the tandem lift adds the load weight for its respective motor 20 to the cumulative load weight signal 255 as it is passed through the motor drive 40. At the last motor drive 40n in the chain, the weight of the load detected on the corresponding motor 20 controlled by the last motor drive 40n is added to the cumulative load weight signal to arrive at a total weight of the load being lifted by the motor drives 40.

According to one aspect of the invention, various combinations of motor drives 40 may be selected for participation in a tandem lift. Although one motor drive 40 may be designated as the first motor drive 40a, this is from a wiring perspective only and does not indicate that the first motor drive 40a need to be involved in all tandem lifts. It simply indicates that the first motor drive 40a will always output a cumulative load weight equal to the weight of the load seen by the corresponding motor 20 controlled by the first motor drive 40a. If, for example, the first motor drive 40a is not being used in a tandem lift, the portion of the load seen by the corresponding motor 20 controlled by the first motor drive 40a will be zero. The first motor drive 40a will, therefore, output a cumulative load weight signal 255 of zero to the second motor drive 40b. If the second motor drive 40b is participating in the tandem lift, the second motor drive 40b will then add the weight of the load seen by its corresponding motor 20 to zero and, therefore, output this weight as the new cumulative load weight signal 225.

According to another aspect of the invention, each motor drive 40 must covert the weight of the load seen by its corresponding motor 20 into a weight scaled to the weight of the material handling system 1. If the measured load in each motor drive 40 is determined as a percentage of rated load, as illustrated in FIGS. 6 and 7, this measured load is a percentage of the rated load for the corresponding motor drive 40. It is contemplated that the rated load for the material handling system 1 may be stored in a parameter 51 of each motor drive 40 and read from memory 52 for use during the conversion. The rated load of each motor drive 40 may be divided by the rated load of the total material handling system 1 and multiplied by the measured load for the motor drive 40 to determine the portion of the total rated load for the material handling system 1 that is measured by each motor drive 40. Optionally, a separate parameter 51 may store the conversion factor and be multiplied directly with the measured load for the motor drive 40. After converting the measured load from a percent of the capacity of the motor drive 40 to a percent of the capacity of the material handling system 1, the converted value of the measured load is added to the cumulative load weight signal 225.

Each motor drive 40 may further be configured to check the cumulative load weight signal 255 to determine whether the load exceeds the rated load for the material handling system 1. After each motor drive 40 adds its measured weight as a percent of the capacity of the material handling system to the cumulative load weight signal 255, it compares the new cumulative load weight signal 255 to the rated load for the material handling system 1. As previously indicated the rated load for the material handling system 1 may be stored in a parameter 51 of each motor drive 40 and, therefore, read from memory 52 for use during the comparison. If the new cumulative load weight signal 255 exceeds the rated load for the material handling system 1 at any one of the motor drives 40, the motor drive 40 may set an overload output signal 260 indicating the load exceeds the rated capacity of the material handling system 1. As illustrated in FIG. 9, the overload output signal 260 from each motor drive 40 may be combined and provided as an input to each motor drive 40. Thus, if any motor drive 40 detects an overload condition, each motor drive is made aware of the condition. It is further contemplated that operation of the motor drives 40 may be configurable in response to the overload signal. The motor drives 40 may either treat the signal as an alarm signal and continue operation or as a fault signal and cease operation. Optionally, the motor drives 40 may be configured to run only in one direction, that is in a lowering direction, requiring that the load be set down rather than continue to be lifted.

According to one embodiment of the invention, the material handling system 1 includes an audio or visual indicator to indicate the presence of a load exceeding the rated load. A central controller may receive the cumulative load weight signal 255 from any of the motor drives 40. Preferably, the cumulative load weight signal 255 is output from the last motor drive 40*n* in the chain and provided to the central controller. According to still another embodiment, the audio or visual indicator may be connected directly to the last motor drive 40*n* in the chain. The audio or visual indicator may be activated, for example, by a binary signal such that the audio or visual indicator is turned on or off. According to another embodiment of the invention, the material handling system 1 includes a display showing the measured load either in a percentage or in physical units, such as such as pounds (lbs) or kilograms (kgs).

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of detecting a percentage of a rated load applied to a hoist in a material handling system using a motor drive controlling a hoisting motor, the method comprising the steps of:

reading a first parameter and a second parameter stored in the motor drive, wherein the first parameter defines an expected level of torque produced by the hoisting motor at a first speed with no load, the second parameter defines an expected level of torque produced by the hoisting motor at a second speed with no load, and the second speed is greater than the first speed;

reading a third parameter and a fourth parameter stored in the motor drive, wherein the third parameter defines an expected level of torque produced by the hoisting motor at the first speed with a rated load and the fourth parameter defines an expected level of torque produced by the hoisting motor at the second speed with the rated load;

measuring a speed of rotation of the hoisting motor;

determining an expected level of torque produced by the hoisting motor at the measured speed with no load as a function of the first and second parameters;

determining an expected level of torque produced by the hoisting motor at the measured speed with rated load as a function of the third and fourth parameters;

determining a magnitude of torque generated by the hoisting motor at the measured speed; and determining the percentage of the rated load applied to the hoist at the measured speed and determined torque as a function of the expected level of torque produced by the hoisting motor at the measured speed with no load and the expected level of torque produced by the hoisting motor at the measured speed with rated load.

2. The method of claim 1 wherein each of the steps is repeated within a periodic interval while the hoisting motor is running.

3. The method of claim 2 wherein the motor drive uses an internal speed reference signal to measure the speed of rotation of the hoisting motor.

4. The method of claim 2 wherein a position feedback device is operatively coupled to the hoisting motor and generates a signal corresponding to an angular position of the hoisting motor and wherein the motor drive measures the speed of rotation of the hoisting motor as a function of a change in the signal corresponding to the angular position of the hoisting motor with respect to time.

5. The method of claim 2 wherein:

the motor drive stores a first set of parameters and a second set of parameters, the first set of parameters includes a first parameter, a second parameter, a third parameter, and a fourth parameter, the second set of parameters includes a first parameter, a second parameter, a third parameter, and a fourth parameter, the first set of parameters defines expected levels of torque produced by the motor while the motor is running at a constant speed at each of the first and second speeds; and the second set of parameters defines expected levels of torque produced by the motor while the motor is accelerating through or approaching each of the first and second speeds.

6. The method of claim 5 further comprising the steps of:

measuring one of a current and a torque output by the motor drive during a first run at the first speed with no load;

measuring one of the current and the torque output by the motor drive during a second run at the second speed with no load;

measuring one of the current and the torque output by the motor drive during a third run at the first speed with the rated load;

measuring one of the current and the torque output by the motor drive during a fourth run at the second speed with the rated load;

determining a torque required by the motor during each of the first, second, third, and fourth runs as a function of the measured current or torque; and storing the torque required by the motor during each of the first, second, third, and fourth runs in the first, second, third, and fourth parameters, respectively, of the first set of parameters.

7. The method of claim 6 further comprising the steps of:
measuring one of the current and the torque output by the motor drive during a fifth run between the first speed and the second speed with no load;
measuring one of the current and the torque output by the motor drive during a sixth run between the first speed and the second speed with the rated load;
determining a torque required by the motor while accelerating at about each of the first and second speeds during each of the fifth and sixth runs as a function of the measured current or torque;
storing the torque required by the motor while accelerating at about each of the first and second speeds during the fifth run in the first and second parameters, respectively, of the second set of parameters; and
storing the torque required by the motor while accelerating at about each of the first and second speeds during the sixth run in the third and fourth parameters, respectively, of the second set of parameters.

8. A motor drive for a hoisting motor, the motor drive comprising:
a plurality of power terminals configured to receive one of alternating current (AC) or direct current (DC) input power from an external power source;
a power conversion section configured to transfer the input power to an output power to the hoisting motor, wherein the output power includes at least one of a controlled current and a controlled voltage;
at least one input terminal configured to receive a command signal corresponding to a desired speed of the hoisting motor;
at least one current sensor configured to generate a signal corresponding to an amplitude of the current output to the hoisting motor;
a memory device configured to store a plurality of instructions and a plurality of parameters; and
a processor configured to execute the plurality of instructions to:
read a first parameter and a second parameter from the plurality of parameters, wherein the first parameter defines an expected level of torque produced by the hoisting motor at a first speed with no load, the second parameter defines an expected level of torque produced by the hoisting motor at a second speed with no load, and the second speed is greater than the first speed,
read a third parameter and a fourth parameter from the plurality of parameters, wherein the third parameter defines an expected level of torque produced by the hoisting motor at the first speed with a rated load and the fourth parameter defines an expected level of torque produced by the hoisting motor at the second speed with the rated load,
measure a speed of rotation of the hoisting motor, determine an expected level of torque produced by the hoisting motor at the measured speed with no load as a function of the first parameter and the second parameter,
determine an expected level of torque produced by the hoisting motor at the measured speed with rated load as a function of the third parameter and the fourth parameter,
determine a magnitude of torque generated by the hoisting motor at the measured speed, and determine the percentage of the rated load applied to the hoist at the measured speed and determined torque as a function of the expected level of torque produced by the hoisting motor at the measured speed with no load and the expected level of torque produced by the hoisting motor at the measured speed with rated load.

9. The motor drive of claim 8 wherein:
the memory device stores a first set of parameters and a second set of parameters,
the first set of parameters includes a first parameter, a second parameter, a third parameter, and a fourth parameter,
the second set of parameters includes a first parameter, a second parameter, a third parameter, and a fourth parameter,
the first set of parameters defines expected levels of torque produced by the hoisting motor while the hoisting motor is running at a constant speed at each of the first and second speeds; and
the second set of parameters defines expected levels of torque produced by the hoisting motor while the hoisting motor is accelerating through or approaching each of the first and second speeds.

10. The motor drive of claim 8 further comprising an input configured to receive a position feedback signal from a position feedback device operatively coupled to the hoisting motor corresponding to an angular position of the motor and wherein the processor measures the speed of rotation of the hoisting motor as a function of a change in the position feedback signal with respect to time.

11. A method of determining a percentage of a rated load applied to a material handling system when the load is lifted using a plurality of hoisting motors, each hoisting motor controlled by a separate motor drive, the method comprising the steps of:
measuring a load applied to a first hoisting motor, selected from the plurality of hoisting motors, with a first motor drive controlling the first hoisting motor;
converting the measured load applied to the first hoisting motor to a first measured load applied to the material handling system;
transmitting a signal corresponding to the first measured load applied to the material handling system from the first motor drive to a second motor drive, the second motor drive controlling a second hoisting motor selected from the plurality of hoisting motors;
measuring a load applied to the second hoisting motor with the second motor drive; converting the measured load applied to the second hoisting motor to a second measured load applied to the material handling system; and
summing the first measured load applied to the material handling system to the second measured load applied to the material handling system in the second motor drive to determine a total load applied to the material handling system;
wherein the steps of measuring the load applied to the first hoisting motor and measuring the load applied to the second hoisting motor further comprise:
reading a first parameter and a second parameter stored in the corresponding motor drive, wherein the first parameter defines an expected level of torque produced by the hoisting motor at a first speed with no load, the second parameter defines an expected level of torque produced by the hoisting motor at a second speed with no load, and the second speed is greater than the first speed;

reading a third parameter and a fourth parameter stored in the corresponding motor drive, wherein the third parameter defines an expected level of torque produced by the hoisting motor at the first speed with a rated load and the fourth parameter defines an expected level of torque produced by the hoisting motor at the second speed with the rated load;

measuring a speed of rotation of the hoisting motor;

determining an expected level of torque produced by the hoisting motor at the measured speed with no load as a function of the first and second parameters;

determining an expected level of torque produced by the hoisting motor at the measured speed with rated load as a function of the third and fourth parameters;

determining a magnitude of torque generated by the hoisting motor at the measured speed; and determining the percentage of the rated load applied to the hoisting motor at the measured speed and determined torque as a function of the expected level of torque produced by the hoisting motor at the measured speed with no load and the expected level of torque produced by the hoisting motor at the measured speed with rated load.

12. The method of claim 11 wherein the load applied to the material handling system is lifted using at least three hoisting motors, the method further comprising the steps of:

transmitting a signal corresponding to the sum of the first and second loads applied to the material handling system from the second motor drive to a third motor drive, the third motor drive controlling a third hoisting motor selected from the plurality of hoisting motors;

measuring a load applied to the third hoisting motor with the third motor drive;

converting the measured load applied to the third hoisting motor to a third measured load applied to the material handling system; and summing the third measured load applied to the material handling system to the signal corresponding to the sum of the first and second loads applied to the material handling system in the third motor drive to determine the total load applied to the material handling system.

13. The method of claim 11 further comprising the steps of:

comparing the total load applied to the material handling system to a maximum load for the material handling system in the second motor drive; and generating a fault signal in the second motor drive when the total load applied to the material handling system is greater than the maximum load for the material handling system.

14. The method of claim 13 further comprising the steps of:

transmitting the fault signal to each of the other motor drives controlling one of the plurality of hoisting motors; and generating a fault signal in each of the other motor drives responsive to the fault signal generated in the second motor drive.

15. An overload detection system for a material handling system including a plurality of hoisting motors to lift a load, the overload detection system comprising a plurality of motor drives, wherein each motor drive is operatively connected to control operation of one of the plurality of hoisting motors, each motor drive including:

an input operable to receive a signal corresponding to a total weight of the load transmitted from one of the other motor drives;

an output operable to transmit a new total weight of the load as determined by the motor drive;

a memory device storing a plurality of instructions and a plurality of parameters; and a processor operable to execute the plurality of instructions to:

measure a load applied to the hoisting motor operatively connected to the motor drive, convert the measured load applied to the hoisting motor to a measured load applied to the material handling system by the motor drive, add the measured load applied to the material handling system by the motor drive to the signal corresponding to the total weight of the load as received from one of the other motor drives to determine the new total weight of the load, and transmit the new total weight of the load from the output;

wherein the processor is further operable to:

read a first parameter and a second parameter from the plurality of parameters, wherein the first parameter defines an expected level of torque produced by the hoisting motor at a first speed with no load, the second parameter defines an expected level of torque produced by the hoisting motor at a second speed with no load, and the second speed is greater than the first speed, read a third parameter and a fourth parameter from the plurality of parameters, wherein the third parameter defines an expected level of torque produced by the hoisting motor at the first speed with a rated load arid the fourth parameter defines an expected level of torque produced by the hoisting motor at the second speed with the rated load, measure a speed of rotation of the hoisting motor, determine an expected level of torque produced by the hoisting motor at the measured speed with no load as a function of the first parameter and the second parameter, determine an expected level of torque produced by the hoisting motor at the measured speed with rated load as a function of the third parameter and the fourth parameter, determine a magnitude of torque generated by the hoisting motor at the measured speed, and determine the percentage of the rated load applied to the hoisting motor at the measured speed and determined torque as a function of the expected level of torque produced by the hoisting motor at the measured speed with no load and the expected level of torque produced by the hoisting motor at the measured speed with rated load.

16. The overload detection system of claim 15 wherein the processor is further operable to:

compare the new total weight of the load to a maximum load for the material handling system; and generate a fault signal when the new total weight of the load is greater than the maximum load for the material handling system.

17. The overload detection system of claim 16 wherein each motor drive further includes:

an output operable to transmit the fault signal to each of the other motor drives controlling one of the plurality of hoisting motors; and an input operable to receive the fault signal from each of the other motor drives.

18. The overload detection system of claim 15 wherein each motor drive further includes an input operable to receive a signal from a position feedback device is operatively coupled to the hoisting motor, wherein the signal corresponds to an angular position of the hoisting motor and wherein the processor measures the speed of rotation of the hoisting motor as a function of a change in the signal corresponding to the angular position of the hoisting motor with respect to time.

* * * * *